(12) United States Patent
Diamond et al.

(10) Patent No.: US 10,986,914 B2
(45) Date of Patent: Apr. 27, 2021

(54) ELECTRIC UTILITY BRUSH HAVING A FLEXIBLE DRIVE SHAFT

(71) Applicant: GlaxoSmithKline Consumer Healthcare (UK) IP Limited, Middlesex (GB)

(72) Inventors: David Diamond, Cascais (PT); Jean Diamond, Cascais (PT)

(73) Assignee: GlaxoSmithKline Consumer Healthcare (UK) IP Limited, Middlesex (GB)

( * ) Notice: Subject to any disclaimer, the term of this patent is extended or adjusted under 35 U.S.C. 154(b) by 83 days.

(21) Appl. No.: 16/073,839

(22) PCT Filed: Feb. 2, 2017

(86) PCT No.: PCT/EP2017/052298
§ 371 (c)(1),
(2) Date: Jul. 30, 2018

(87) PCT Pub. No.: WO2017/134183
PCT Pub. Date: Aug. 10, 2017

(65) Prior Publication Data
US 2019/0038011 A1    Feb. 7, 2019

(30) Foreign Application Priority Data
Feb. 5, 2016    (IE) ..................... 2016/0046

(51) Int. Cl.
| A46B 5/00 | (2006.01) |
| A61C 1/18 | (2006.01) |
| A61C 17/34 | (2006.01) |
| A46B 9/02 | (2006.01) |

(Continued)

(52) U.S. Cl.
CPC ............ *A46B 5/007* (2013.01); *A46B 5/0058* (2013.01); *A46B 5/0075* (2013.01); *A46B 9/026* (2013.01); *A46B 13/02* (2013.01); *A61C 1/18* (2013.01); *A61C 1/185* (2013.01); *A61C 17/26* (2013.01); *A61C 17/3418* (2013.01); *A61C 17/3436* (2013.01); *A46B 2200/3086* (2013.01)

(58) Field of Classification Search
CPC ..... A46B 5/007; A46B 5/0058; A46B 5/0075; A46B 9/026; A61C 1/18; A61C 1/185; A61C 17/3418; A61C 17/3436
See application file for complete search history.

(56) References Cited

U.S. PATENT DOCUMENTS

| 5,173 A | 6/1847 | Le |
| 5,173,983 A | 12/1992 | Le |
| 5,902,107 A | 5/1999 | Lowell |

(Continued)

FOREIGN PATENT DOCUMENTS

| DE | 4315320 A1 | 11/1994 |
| EP | 1878402 A1 | 1/2008 |

(Continued)

*Primary Examiner* — Randall E Chin
(74) *Attorney, Agent, or Firm* — Roshni A. Sitapara

(57) ABSTRACT

The present invention is concerned with an electric utility brush having a flexible drive shaft, and in particular an electric toothbrush having a substantially spherical head mounted on the flexible drive shaft and which can be driven rotationally in at least two different orientations in order to provide comprehensive brushing capabilities.

18 Claims, 3 Drawing Sheets

(51) Int. Cl.
*A46B 13/02* (2006.01)
*A61C 17/26* (2006.01)

(56) References Cited

U.S. PATENT DOCUMENTS

| | | |
|---|---|---|
| 7,331,077 B1 | 2/2008 | Henry |
| 8,132,541 B1 | 3/2012 | Baer, Jr. |
| 2003/0079304 A1* | 5/2003 | Dworzan ........... A61C 17/3481 15/22.1 |
| 2017/0100205 A1* | 4/2017 | Valavanis ................ A61C 1/14 |

FOREIGN PATENT DOCUMENTS

| | | |
|---|---|---|
| FR | 2926210 A1 | 7/2009 |
| NL | 1033173 C2 | 7/2008 |

* cited by examiner

ELECTRIC UTILITY BRUSH HAVING A FLEXIBLE DRIVE SHAFT

This application is a 371 of International Application No. PCT/EP2017/052298, filed Feb. 2, 2017, which claims the priority of IE S2016/0046 filed Feb. 5, 2016.

Field of the Invention

This invention relates to an electric utility brush having a flexible drive shaft, and in particular an electric toothbrush having a substantially spherical head which can be driven rotationally in at least two different orientations in order to provide comprehensive brushing capabilities.

BACKGROUND OF THE INVENTION

Electric brushes for various applications, for example electric toothbrushes, polishing brushes, cleaning brushes, etc. are well known and take many forms, generally incorporating a head with an array of bristles, and drive means, usually in the form of an electric motor or the like, which are adapted to impart at least one driving motion to the head. For an electric toothbrush one of the most common driving motions is rotational. In some cases a number of driving modes may be available, for example allowing the brush head to be rotationally driven about one axis as one driving mode, and alternatively about a second axis as a second driving mode. This may be beneficial for certain applications, for example in the case of an electric toothbrush allowing the axis of rotation of the brush head to be located in two or more different orientations to provide the most efficient brushing action for the particular group of teeth being brushed.

While such brushes are known, in order to implement the above functionality it has generally been necessary to employ complex transducers or gearing mechanisms in order to allow drive to be imparted to the head when set in these different orientations, thereby increasing the complexity of the brush, and thus generally reducing the reliability of same while at the same time increasing the manufacturing cost due to the increased complexity of the internal components of the brush. These issues are further complicated when such functionality is to be achieved in an electric toothbrush, which due to its diminutive size can give rise to difficulties in producing the complex gears or other components in the reduced dimensions necessary, which dimensions also give rise to relatively high wear rates for the parts, thus further reducing the reliability of same. This is obviously an undesirable characteristic for mass produced commercial products such as electric toothbrushes or the like.

It is therefore an object of the present invention to address the above-mentioned issues.

STATEMENTS OF INVENTION

According to the present invention there is provided an electric utility brush comprising a head having a tufted surface, wherein the head can be displaced into at least two orientations for rotation; a drive shaft to impart rotational drive to the head, wherein the drive shaft comprises a flexible portion to facilitate the displacement between the at least two rotation orientations.

Preferably, the tufted surface comprises a curved surface.

Preferably, the flexible drive shaft enables drive to be maintained to the head between and at the two rotation orientations.

Preferably, the flexible portion comprises a spring.

Preferably, the spring comprises a helical coil spring.

Preferably, the drive shaft directly imparts rotation to the head.

Preferably, the flexible portion enables an axis of rotation of the head to be displaceable to define two of the rotation orientations.

Preferably, the flexible portion is curved when the head is in the first rotation orientation.

Preferably, the head comprises an incomplete spherical tufted surface.

Preferably, the head comprises a substantially complete spherical tufted surface.

Preferably, the brush comprises an actuator operable to displace the head between the at least two rotation orientations.

Preferably, the actuator is operable to effect the longitudinal displacement of the drive shaft.

Preferably, the actuator comprises a first section defining a worm and a second section defining a follower engagable with the worm in order to effect the axial displacement of the second section relative to the first section.

Preferably, the utility brush comprises a guide assembly defining a fixed path along which the head is displaceable between the at least two rotation orientations.

Preferably, the guide assembly defines an arcuate path along which the head is displaceable.

Preferably, the guide assembly comprises a gimbal frame.

Preferably, the brush comprises a guard partially surrounding the head.

Preferably, the frame is pivotally mounted to the guard.

Preferably, the brush comprises a hollow stem in which the drive shaft is at least partially housed.

Preferably, the brush comprises drive means operable to effect rotation of the drive shaft.

Preferably, the brush comprises a handle from which the hollow stem extends, the drive means being at least partially housed within the handle.

As used herein, the term "tufted" is intended to mean a surface or object which has one or more tufts of bristles or the like projecting outwardly from the surface, a brush head being an example of an object defining such a tufted surface.

BRIEF DESCRIPTION OF THE DRAWINGS

The present invention will now be described with reference to the accompanying drawings, in which.

DETAILED DESCRIPTION OF THE DRAWINGS

Referring now to the accompanying drawings there is illustrated an electric utility brush, generally indicated as (10), which in the particular embodiment illustrated takes the form of an electric toothbrush (10) which is capable of providing multiple brushing modes to enable superior brushing capability over a conventional electric toothbrush. It will of course be appreciated from the following description of the configuration and operation of the electric toothbrush (10) that the brush (10) of the invention has many applications other than electric toothbrushes.

Figure 1:
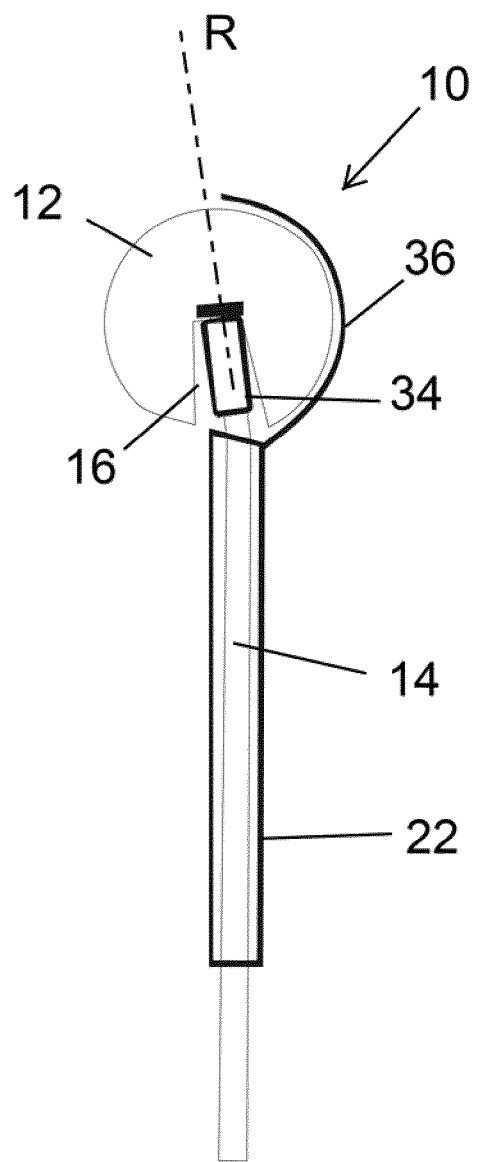
FIG. 1 illustrates a schematic representation of an electric utility brush in the form of an electric toothbrush according to an embodiment of the present invention, with a head of the brush being positioned in a first rotation orientation.
Figure 2:
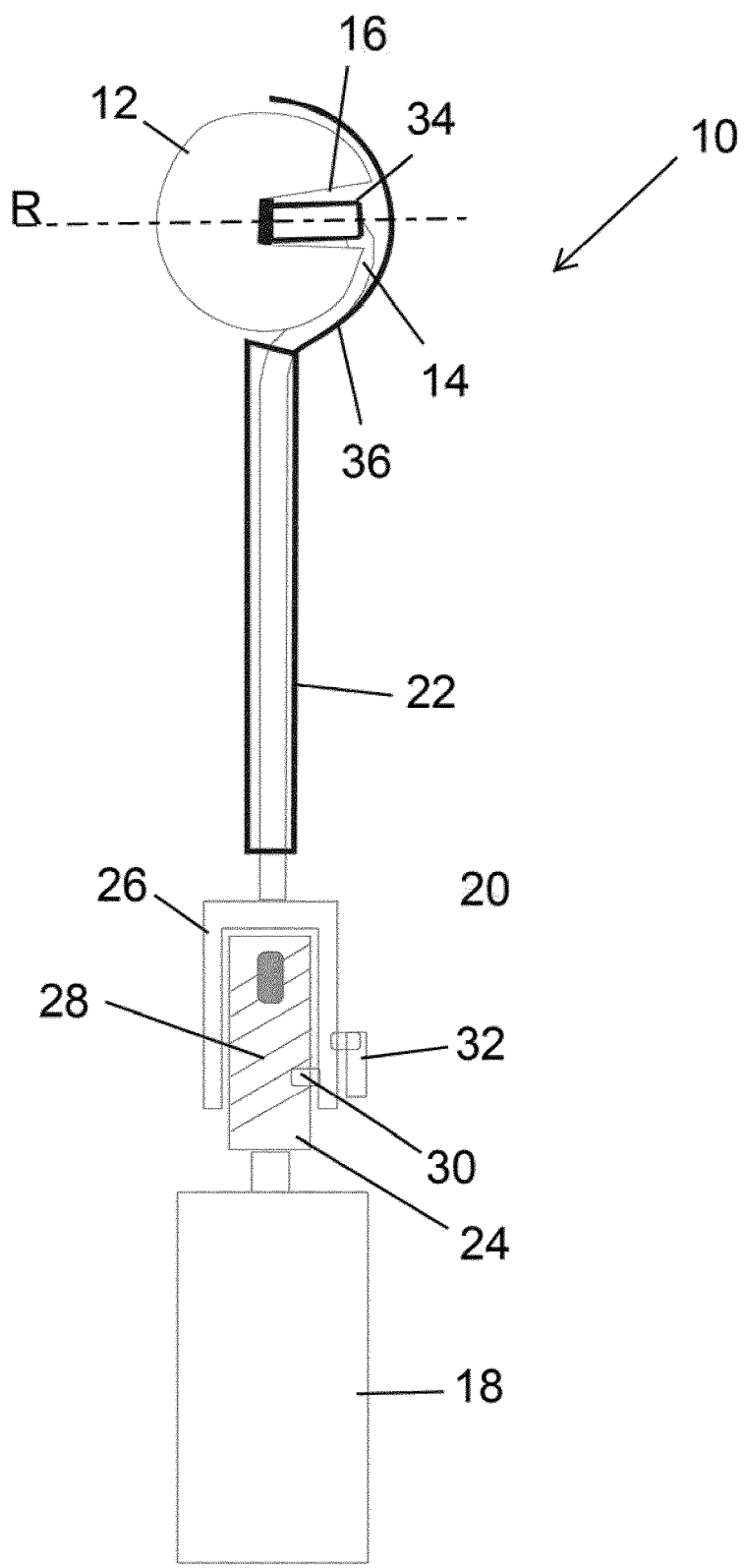
FIG. 2 illustrates the utility brush shown in FIG. 1 with the head of the brush being positioned in a second rotation orientation.
Figure 3:
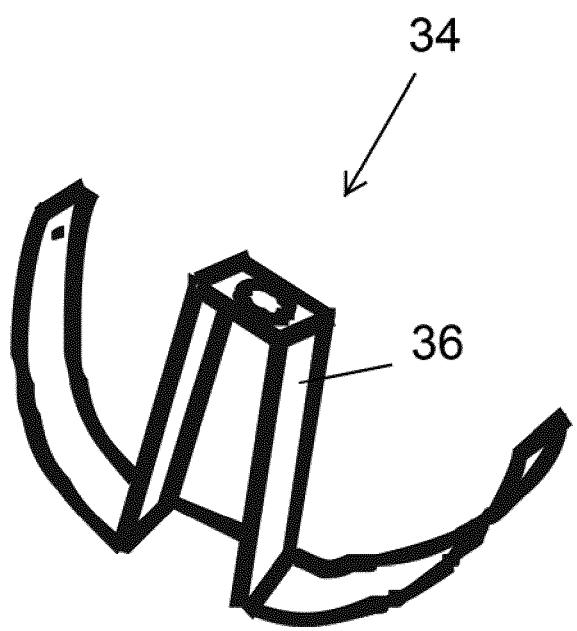
FIG. 3 illustrates a schematic representation of a frame for retaining the head of the brush and constraining the head for displacement between two rotation orientations.

The brush (10) comprises a brush head (12) which is illustrated schematically in FIGS. 1 and 2, but which in practice comprises a tufted surface, and most preferably a tufted curved surface, for example a hemispherical or substantially fully spherical head (12) from which projects an array of bristle tufts (not shown) or the like in order to enable the head (12) to effect a brushing/cleaning action. The brush (10) additionally comprises a drive shaft (14) which is adapted to impart rotational drive to the head (12), and in the embodiment illustrated is directly connected to the head (12) via a channel (16) formed in the head (12) which enables one end of the drive shaft (14) to be fixed at a centre of the head (12). The channel (16) is in the form of a substantially cylindrical bore extending into the centre of the head (12) from the outer surface. The channel (16) may taper inwardly towards the centre of the head (12).

The brush (10) further comprises drive means in the form of a motor (18) operable to impart drive, via an actuator (20) whose functionality will be described hereinafter, to the drive shaft (14) for transmission to the head (12). The motor (18) may be partially or fully housed within a handle (not shown) forming part of the brush (10) as is well known in the art. The handle (not shown) may also contain a power source such as a rechargeable battery (not shown) or the like in order to supply power to the motor (18), in addition to any control componentry necessary to effect the various modes of operation as hereinafter described.

In order to allow multiple brushing actions to be achieved the head (12) is displaceable between at least two different orientations, and in the exemplary embodiment illustrated between a first rotation orientation as illustrated in FIG. 1 in which an axis of rotation (R) of the head (12) is substantially in line with a longitudinal axis of the brush (10), and a second rotation orientation as illustrated in FIG. 2 in which the axis of rotation (R) of the head (12) is disposed substantially perpendicular to the longitudinal axis of the brush (10).

In order to enable drive to be maintained to the head (12) as it is displaced between these two rotation orientations, the drive shaft (14) comprises a flexible portion at least in the region of the head (12), which flexible portion enables the drive shaft (14) to remain in driving engagement with the head (12) but to deform in order to accommodate the displacement of the head (12) from the first rotation orientation into the second rotation orientation. In the exemplary embodiment illustrated the complete length of the drive shaft (14) is flexible, and may for example be comprised of a helical coil spring, which have be found to be capable of delivering rotational drive from the motor (18) to the head (12) with the drive shaft (14) in both a straight un-deformed state as illustrated in FIG. 1 and a deformed or curved state as illustrated in FIG. 2. However it will also be appreciated that any other suitable form of flexible drive shaft (14) may be employed.

In the embodiment illustrated the drive shaft (14) extends from the actuator (20), through a hollow sleeve (22) which forms a stem of the brush (10), before exiting the sleeve (22) and passing into the channel (16) and connects directly to the head (12). It will be appreciated that as the head (12) is displaced from the first rotation orientation as illustrated in FIG. 1 into the second rotation orientation as illustrated in FIG. 2, the length of the portion of the drive shaft (14) which exits the sleeve (22) and connects to the head (12) increases in length as the head (12) is displaced towards the second rotation orientation. In order to accommodate this increase in length the drive shaft (14) must either stretch and/or an additional portion of the drive shaft (14) must be displaced out of the sleeve (22) in order to provide the extra length necessary to permit the head (12) to be displaced into the second rotational orientation.

In the exemplary embodiment illustrated the actuator (20) facilitates the supply of this additional length of drive shaft (14). The actuator (20) comprises a first section (24) which is directly connected to and driven by the motor (18), and a second section (26) coupled to the first section (24) such that rotational drive from the motor (18) is transmitted from the first section (24) to the second section (26), the second section (26) being longitudinally displaceable relative to the first section (24). In the preferred embodiment illustrated the first and second sections (24), (26) are telescopically arranged relative to one another. In this way the second section (26) can be displaced towards the head (12) in order to displace a portion of the drive shaft (14) out of the end of the sleeve (22) in order to accommodate displacement of the head (12) into the second rotation orientation, while retaining driving engagement with the motor (18). Conversely when the head (12) is displaced back into the first rotation orientation the second section (26) can be drawn back down over the first section (24) in order to retract the extra length of the drive shaft (14) back into the sleeve (22). Operation of the actuator (20) may be achieved manually or in response to the operation of one or more controls (not shown) provided on the brush (10).

In addition, the first section (24) comprises a worm (28) and the second section (26) comprises a follower (30) which engages the worm (28) and thus if the second section (26) is prevented from rotating with the first section (24) the interaction of the follower (30) with the worm (28) will result in the axial displacement of the second section (26) relative to the first section (24) in order to effect displacement of the drive shaft (14) relative to the sleeve (22). A controller (32), which may be mechanical, electrical or a combination, is operable to selectively prevent rotation of the second section (26) in order to precipitate the above described functionality.

As a result of the above action it will be understood that the actuator (20) may be actively utilised to effect displacement of the head (12) between the first rotation orientation and the second rotation orientation. With the head (12) positioned in the first rotation orientation as illustrated in FIG. 1 the actuator (20) may be expanded by displacing the second section (26) away from the first section (24) in order to force a portion of the drive shaft (14) out of the end of the sleeve (22). The additional length of drive shaft (14) is thus pushed into the channel (16) causing that portion of the drive shaft (14) to begin to bow or curve and thus push against the wall of the channel (16) which will act to displace the head (12) from the first rotation orientation towards the second rotation orientation.

In order to facilitate this functionality the head (12) is preferably mounted in a gimbal arrangement with a frame (34) pivotably mounted to a guard (36) which is provided about a portion of the head (12). The frame (34) comprises a bearing portion which sits into the channel (16) of the head (12) and acts to support the end of the drive shaft (14) at the point of connection to the head (12). It is against a wall of this bearing portion that the drive shaft (14) pushes as it is begins to bow or curve in response to the drive shaft (14) being displaced upwardly out of the sleeve (22) by the actuator (20). In order to ensure that this functionality is achieved the drive shaft (14) may be arranged to have a slight curve in the portion within the channel (16) when the head (12) is positioned in the first rotation orientation, as can be seen in FIG. 1. Thus once the drive shaft (14) is displaced by the actuator (20) the curvature of drive shaft (14) in this region will increase and push against the frame (34), in particular the bearing portion, so as to displace the head (12) By positioning a pivot axis of the frame (34) to extend perpendicularly to the longitudinal axis of the brush (10), the head (12) will be constrained for displacement along an arcuate path between the first and second rotation orientations illustrated. It will be understood that the initial curvature of the drive shaft (14) within the channel (16) could be introduced by other means, such as a cam (not shown) or the like acting against the drive shaft (14) in order to introduce the necessary curvature.

In the exemplary embodiment illustrated a suitable gap is provided between the inner surface of the guard (36) and the outer surface of the head (12) in order to accommodate the additional length of the drive shaft (14) that is drawn out of the sleeve (22) when the head (12) is displaced into the second rotation orientation as illustrated in FIG. 2. In this way the additional length of the drive shaft that is displaced out of the sleeve (22) will remain covered by the guard (36) and thus is not exposed during operation of the brush (10). This portion of the drive shaft (14) may also be surrounded by a protective sheath (not shown) or the like in order to prevent contact between the rotating drive shaft (14) and the head (12), in particular the bristles (not shown) projecting from the head (12). In order to reduce or eliminate such contact the curvature of the path between the upper end of the sleeve (22) and the entrance to the channel (16), when the head (12) is in the second position, may be reduced in order to reduce the deformation of the drive shaft (14) and to allow the drive shaft (14) to be positioned closer to the guard (36) and thus further from the head (12).

As an alternative arrangement the frame (34) could be modified to travel along a track (not shown), for example provided on the inner surface of the guard (36) in order to define the arcuate path along which the modified frame (not shown) travels in order to effect displacement of the head (12) between the first and second rotation orientation. It will also be appreciated that any other functional alternative may be employed, and for example one arrangement may allow for additional orientations or brushing modes to be enabled, by allowing the head (12) to be located in a third rotation orientation.

It will thus be appreciated that by providing a brush (10) having a head (12) driven by a flexible drive shaft (14) multiple brushing modes may be accomplished with minimal moving parts while ensuring that drive is maintained to the head (12).

The invention claimed is:

1. An electric toothbrush comprising a head having a tufted surface, wherein the head can be displaced into at least two orientations for rotation; a drive shaft to impart rotational drive to the head, wherein the drive shaft comprises a flexible portion to facilitate the displacement between the at least two rotation orientations further comprising an actuator operable to displace the head between the at least two rotation orientations via longitudinal displacement of the drive shaft.

2. The electric toothbrush of claim 1 in which the tufted surface comprises a curved surface.

3. The electric toothbrush of claim 1 in which the drive shaft enables drive to be maintained to the head between and at the two rotation orientations.

4. The electric toothbrush of claim 1 in which the flexible portion comprises a spring.

5. The electric toothbrush of claim 4 in which the spring comprises a helical coil spring.

6. The electric toothbrush of claim 1 in which the drive shaft directly imparts rotation to the head.

7. The electric toothbrush of claim 1 in which the flexible portion enables an axis of rotation of the head to be displaceable to define two of the rotation orientations.

8. The electric toothbrush of claim 1 in which the flexible portion is curved when the head is in the first rotation orientation.

9. The electric toothbrush of claim 1 in which the head comprises an incomplete spherical tufted surface.

10. The electric toothbrush of claim 1 in which the head comprises a substantially complete spherical tufted surface.

11. The electric toothbrush of claim 1 in which the actuator comprises a first section defining a worm and a second section defining a follower engagable with the worm in order to effect the axial displacement of the second section relative to the first section.

12. The electric toothbrush of claim 1 in which the toothbrush comprises a guide assembly defining a fixed path along which the head is displaceable between the at least two rotation orientations.

13. The electric toothbrush of claim 12 in which the guide assembly defines an arcuate path along which the head is displaceable, and wherein the guide assembly comprises a gimbal frame.

14. The electric toothbrush of claim 13 in which the gimbal frame is pivotally mounted to the guard.

15. The electric toothbrush of claim 12 in which the toothbrush comprises a guard partially surrounding the head.

16. The electric toothbrush of claim 1 in which the toothbrush comprises a hollow stem in which the drive shaft is at least partially housed, and wherein the toothbrush comprises a drive means operable to effect rotation of the drive shaft.

17. The electric toothbrush of claim 16 in which the toothbrush comprises a handle from which the hollow stem extends, the drive means being at least partially housed within the handle.

18. The electric toothbrush of claim 1 in which the toothbrush comprises a guard partially surrounding the head.

* * * * *